United States Patent
Hamilton et al.

(10) Patent No.: US 7,277,195 B2
(45) Date of Patent: *Oct. 2, 2007

(54) SYSTEM AND METHOD FOR MONITORING INFORMATION DELIVERED THROUGH AN ELECTRONIC DELIVERY SYSTEM

(75) Inventors: Scott Hamilton, Richmond, VA (US); Junious Gupton, Richmond, VA (US); Todd Beck, Forest, VA (US); Varun Tandon, New Delhi (IN); Glen Young, Glen Allen, VA (US); Jeff Gainer, Richmond, VA (US); Randy Harris, Midlothian, VA (US)

(73) Assignee: Genworth Financial, Inc., Richmond, VA (US)

( * ) Notice: Subject to any disclaimer, the term of this patent is extended or adjusted under 35 U.S.C. 154(b) by 552 days.

This patent is subject to a terminal disclaimer.

(21) Appl. No.: 10/813,234

(22) Filed: Mar. 31, 2004

(65) Prior Publication Data

US 2004/0184101 A1     Sep. 23, 2004

Related U.S. Application Data

(62) Division of application No. 10/014,544, filed on Dec. 14, 2001, now Pat. No. 6,799,150.

(51) Int. Cl.
*G06K 15/00* (2006.01)
*G06F 3/12* (2006.01)

(52) U.S. Cl. .................... 358/1.15; 358/402
(58) Field of Classification Search ........... 358/1.1, 358/1.9, 1.13, 1.18, 402, 448; 709/201, 203, 709/228, 232

See application file for complete search history.

(56) References Cited

U.S. PATENT DOCUMENTS

| | | | |
|---|---|---|---|
| 5,210,869 A | 5/1993 | Williams | |
| 5,293,250 A | 3/1994 | Okumura et al. | |
| 5,424,724 A | 6/1995 | Williams et al. | |
| 5,675,507 A | 10/1997 | Bobo | |
| 5,761,284 A | 6/1998 | Ranalli et al. | |
| 5,790,790 A | 8/1998 | Smith et al. | |
| 6,256,666 B1 | 7/2001 | Singhal | |
| 6,282,565 B1 | 8/2001 | Shaw et al. | |
| 6,359,974 B1 | 3/2002 | Ishibashi | |
| 6,385,655 B1 | 5/2002 | Smith et al. | |
| 6,483,599 B1 | 11/2002 | Woodman et al. | |
| 2001/0032245 A1 | 10/2001 | Fodor | |
| 2001/0047389 A1 | 11/2001 | Prahlad et al. | |
| 2002/0099681 A1 | 7/2002 | Gainey et al. | |
| 2002/0128954 A1* | 9/2002 | Evans | 705/37 |
| 2002/0156859 A1 | 10/2002 | Wang et al. | |

(Continued)

OTHER PUBLICATIONS

PCT-International Search Report dated Apr. 8, 2003 for Application No. PCT/uS02/39204, filed Dec. 9, 2002.

*Primary Examiner*—Gabriel Garcia
(74) *Attorney, Agent, or Firm*—Hunton & Williams LLP

(57) ABSTRACT

A system and method are provided for monitoring information delivered through an electronic delivery system. One method for monitoring electronically delivering documents is provided which includes the steps of: creating log files for storing selected data related to selected electronic document preparation events; forwarding the log files to a central database for storage; and providing access to the log files for retrieval and analysis.

22 Claims, 5 Drawing Sheets

U.S. PATENT DOCUMENTS

2002/0188689 A1* 12/2002 Michael ................... 709/206
2004/0117451 A1* 6/2004 Chung .................... 709/207
2006/0236404 A1* 10/2006 Burakoff et al. ............ 726/26

* cited by examiner

US 7,277,195 B2

SYSTEM AND METHOD FOR MONITORING INFORMATION DELIVERED THROUGH AN ELECTRONIC DELIVERY SYSTEM

RELATED APPLICATIONS

This patent application is a Divisional of U.S. patent application No. 10/014,544, filed on Dec. 14, 2001, now U.S. Pat. No. 6,799,150, entitled "System and Method for Monitoring Information Delivered Through An Electronic Delivery System", which is also hereby incorporated by reference in its entirety.

BACKGROUND OF THE INVENTION

The present invention generally relates to a system and method for monitoring the delivery of electronic documents. More specifically, the present invention relates to a system and method for monitoring the deliveries of electronic documents which are designated for electronic delivery within a document generating system.

At present, almost every business of any size communicates with its customers almost exclusively through forms and documents which are printed and mailed. Typically, in this process documents are prepared using word processors which output the completed documents via a printer. Once out of the printer, the document is then inserted into an envelope and mailed. Overall, the present system for communicating with customers is both slow and very expensive involving high labor and postage costs for each piece of correspondence.

For these reasons, many companies have tried to encourage their customers to use the Internet to keep updated and to receive correspondence. However, the present systems available for companies are extremely limited in their scope and they require a great deal of customer participation to operate effectively. Additionally, many companies are reluctant to trust an electronic delivery system to transmit important documents. In many cases, such distrust is well founded as the present systems available for electronic document delivery are unreliable. In particular, many of the present document delivery systems are unreliable due to addressing errors for electronic mailboxes which are notoriously prone to user error. Additionally, the present systems offer no effective means for tracking or monitoring the documents and document data delivered through an electronic delivery system.

Accordingly, what is needed is a comprehensive electronic delivery system which includes a reliable and effective method and system for monitoring the electronic delivery of documents and document data.

SUMMARY OF THE INVENTION

According to the present invention, a system and method are provided for reliably monitoring the delivery of electronic documents.

According to one embodiment of the present invention, one method for electronically delivering documents is provided which includes the steps of: creating log files for storing selected data related to selected electronic document preparation events; forwarding the log files to a central database for storage; and providing access to the log files for retrieval and analysis. Additional objects and advantages of the present invention will be set forth in part in the description which follows, and in part will be obvious from the description, or may be learned by practice of the invention.

The objects and advantages of the invention may be realized and attained by means of instrumentalities and combinations, particularly pointed out in the appended claims.

BRIEF DESCRIPTION OF THE DRAWINGS

The invention may take physical form in certain parts and arrangements of parts, an illustrative embodiment and method of which will be described in detail in this specification and illustrated in the accompanying drawings which form a part hereof, and wherein.

DETAILED DESCRIPTION OF THE INVENTION

Figure 1:
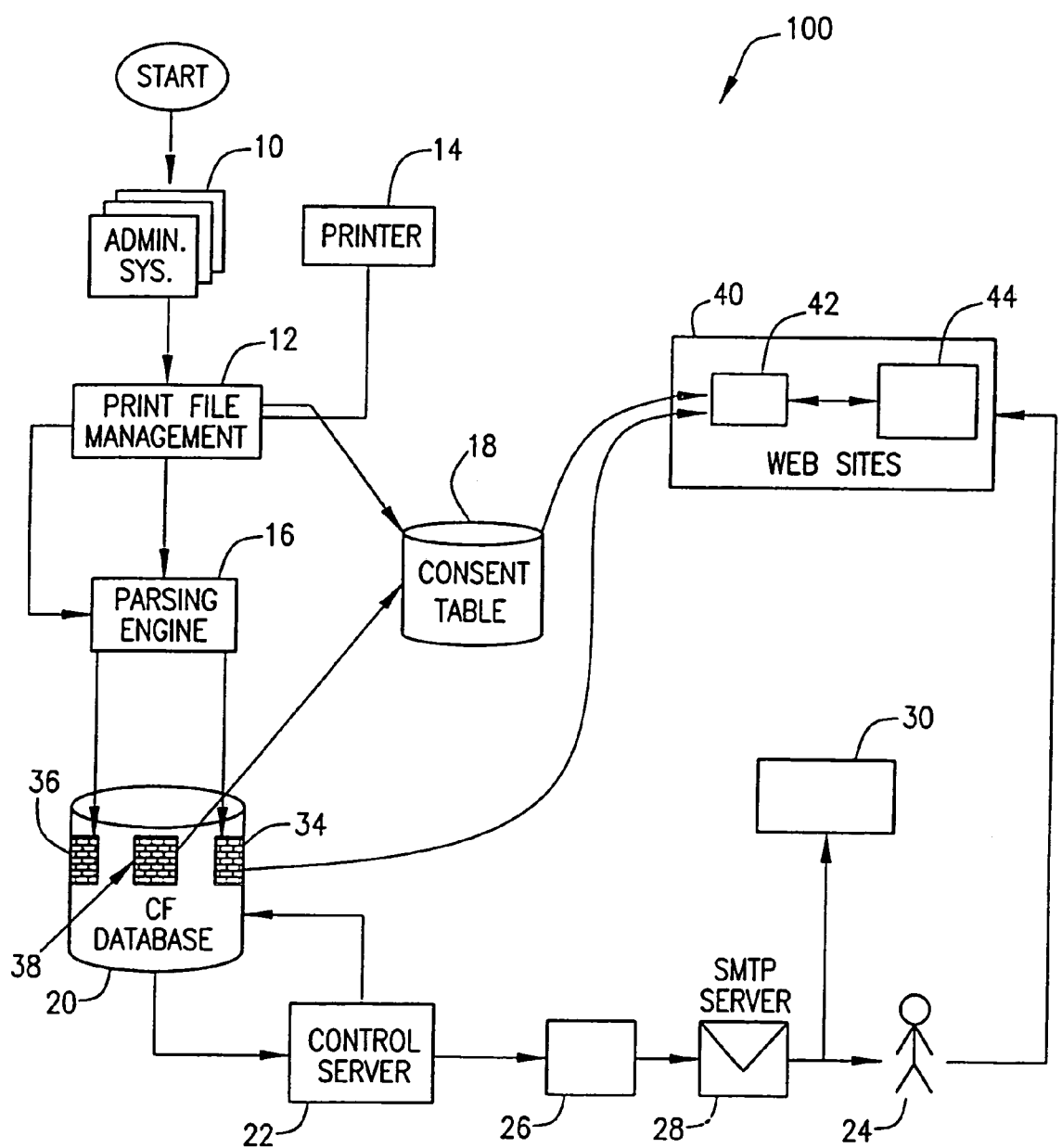
FIG. 1 is a simplified schematic representation illustrating one example of a computer network configuration for use with an exemplary embodiment of the present invention.

Reference will now be made in detail to the exemplary embodiments of the invention, an example of which is illustrated in the accompanying drawings in which like reference characters refer to corresponding elements. Preferably, the system and method of the present invention described below may be implemented by an interactive computer software application incorporated within a computer-readable medium such as a hard disk drive, an optical medium such as a compact disk, or the like. Further, the computer-readable medium may be available to a user either locally on the user's computer or remotely over a computer network, such as a local area network (LAN) or through the Internet.

The present invention provides users with a comprehensive solution for the electronic delivery of documents. Additionally, the present invention provides multiple means for monitoring the document delivery process and for correcting failed document delivery.

FIG. 1 illustrates an example network arrangement 100 employing a system and method of the present invention in accordance with an exemplary embodiment of the invention. It should be understood that the present invention operates independent of any particular arrangement or mix of network components and that the network 100 depicted in FIG. 1 is purely illustrative and simplified for the purpose of explanation.

As shown in FIG. 1, the exemplary network arrangement 100 is comprised of an administrative system 10. According to the preferred embodiment of the present invention, this administrative system 10 may be any computer or network of computers or computer systems which stores and/or produces documents. For the purposes of the present invention, the term "documents" is used to refer to any set of text communication whether in electronic or non-electronic form which may be printed out or viewed on a computer monitor. Further, the exemplary network arrangement 100 further comprises a print management server 12 for accepting document data and document print requests from the administrative system 10; and a parsing engine 16 for processing and storing document data on a central database server 20 which may include a print file database 38 for storing print files and other document data, a restricted database 36 for use by selected administrators, and a customer database 34 which may be accessible via by customers via, for example, the Internet.

As further shown in FIG. 1, in accordance with an exemplary embodiment, the present invention may include a consent database 18 for storing the document delivery preferences for each customer. As discussed above, such document delivery preferences may include an option or a designation for each customer 24 to either receive documents electronically or non-electronically. Further in accordance with an exemplary embodiment, the present invention may also include a web server 40 for allowing customers 24 to access their customer data and electronic document data. According to an exemplary embodiment, such web access preferably includes access for all customers including both customers receiving documents electronically and non-electronically. In this way, customers who wish to keep and receive documents non-electronically may also have on-line access to their document data. As shown, the web server 40 may further include a customer authorization module 44 for controlling access to the web server 40 and a presentment module 42 for providing access to electronic documents and customer data. As further shown, the web server 40 may access selected data and electronic documents from a variety of sources including, for example, from the central database 20. Additionally, in accordance with a further exemplary embodiment, the present invention may include a failed email monitoring system 30 as described in detail below with reference to FIG. 3.

Figure 2:
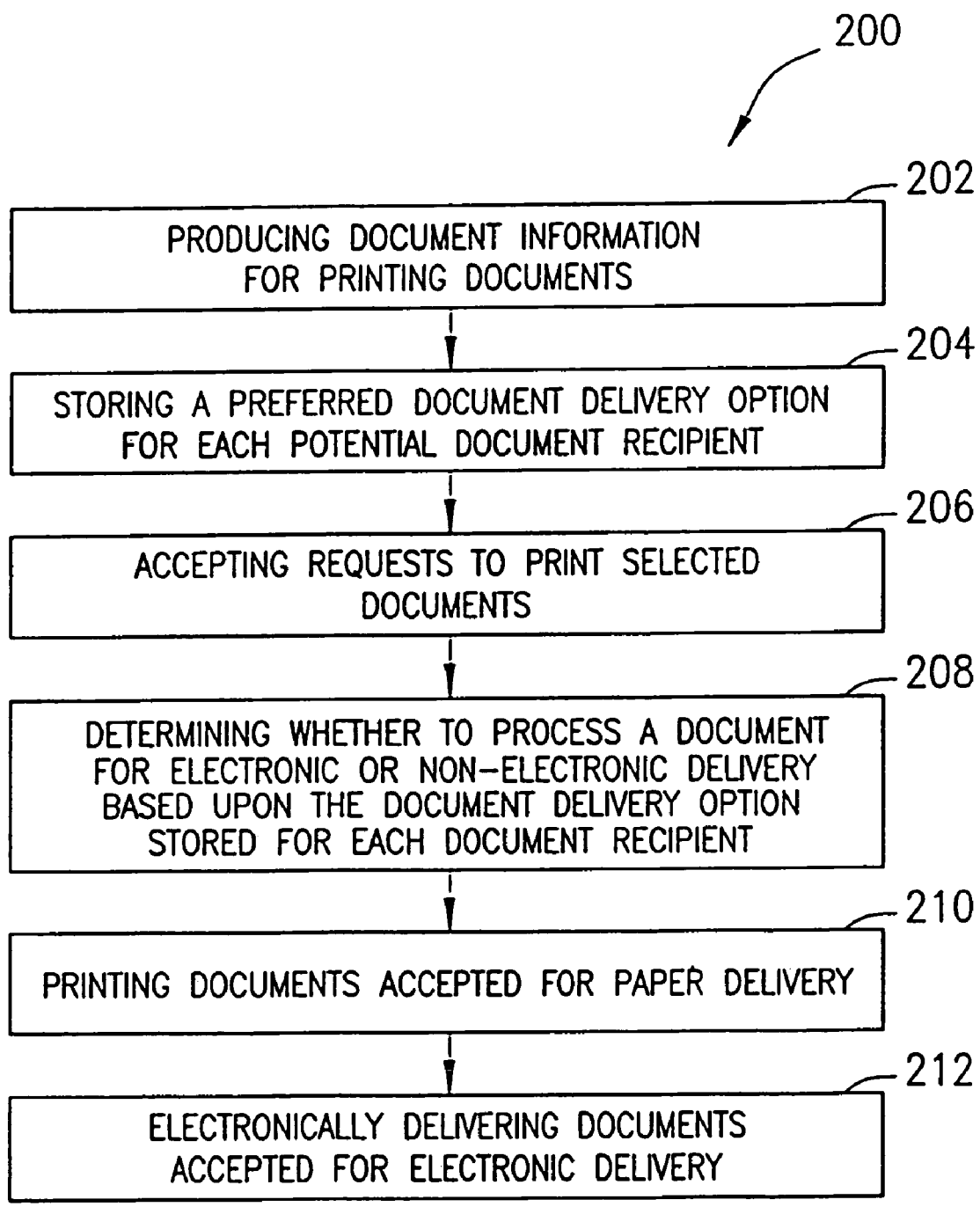
FIG. 2 is a simplified flowchart of a method for electronically delivering documents in accordance with an exemplary embodiment of the present invention.

FIG. 2 shows a block diagram illustrating steps in a method 200 for electronically delivering documents in accordance with an exemplary embodiment of the present invention. At step 202, users may produce documents within the administrative system 10 which are then stored and processed as electronic documents. At step 204, one or more document delivery options for each potential document recipient may be stored on a database or the like. In accordance with an exemplary embodiment of the present invention, the delivery options for each potential document recipient are preferably stored within the consent database 18 which is accessible throughout the network arrangement 100. Further in accordance with an exemplary embodiment of the present invention, the delivery option or designation for each potential document recipient is preferably set for either electronic document delivery or non-electronic document delivery. Preferably, each delivery option may be controlled by a network administrator or customer service representative using, for example, an intranet portal or the like. Alternatively, the delivery option may be configured to be set by individual customers via the web server 40 or by the failed email monitoring system 30 as described in detail below with reference to FIG. 3. In accordance with a preferred embodiment of the present invention, the delivery options for multiple document recipients belonging to specific groups or business units may be controlled and changed together by a selected manager or administrator. In this way, an organization can uniformly tailor their document delivery preferences and choices without having to change the delivery options for each employee or customer individually.

In step 206, a request to print selected documents is generated by the administrative system 10 and the request is forwarded to the print management server 12. In step 208, the print management server 12 determines whether to process the requested documents for electronic or non-electronic delivery based upon the document delivery option stored for each document recipient. In accordance with a preferred embodiment of the present invention, the print management server 12 determines the document delivery option for each selected document by accessing the document delivery option stored on the consent database 18.

In step 210, the print management server 12 forwards the documents selected for non-electronic delivery to a printer 14 for printing and mailing. In step 212, the print management server 12 forwards the documents selected for electronic delivery to an electronic delivery system. In accordance with an exemplary embodiment of the present invention, the electronic delivery system preferably includes a parsing engine 16 or similar device for processing and sorting document data for storage on the central database 20 which is then made available to control server 22 for composing electronic documents for email delivery to each customer 24 and to a web server 40 for on-line viewing. As discussed above, in accordance with an exemplary embodiment of the present invention, the electronic delivery system preferably composes electronic notices to customers which informs the customers of documents and document data updated to the web server 40 which are available for viewing.

Further in accordance with an alternative exemplary embodiment of the present invention, the control server 22 may also compose an electronic document containing document data and transmit the composed electronic document to the customer for viewing as, for instance, an email attachment or the like. As discussed above with respect to transmitting notices, each composed electronic copy of a stored electronic document may be forwarded to an email server 28 for transmission to the intended email recipient. Further, as discussed above, an additional server 26 may also be provided to combine or "bulk" electronic documents together prior to delivery so that customers may receive one email containing several copies of composed electronic documents.

Figure 3:
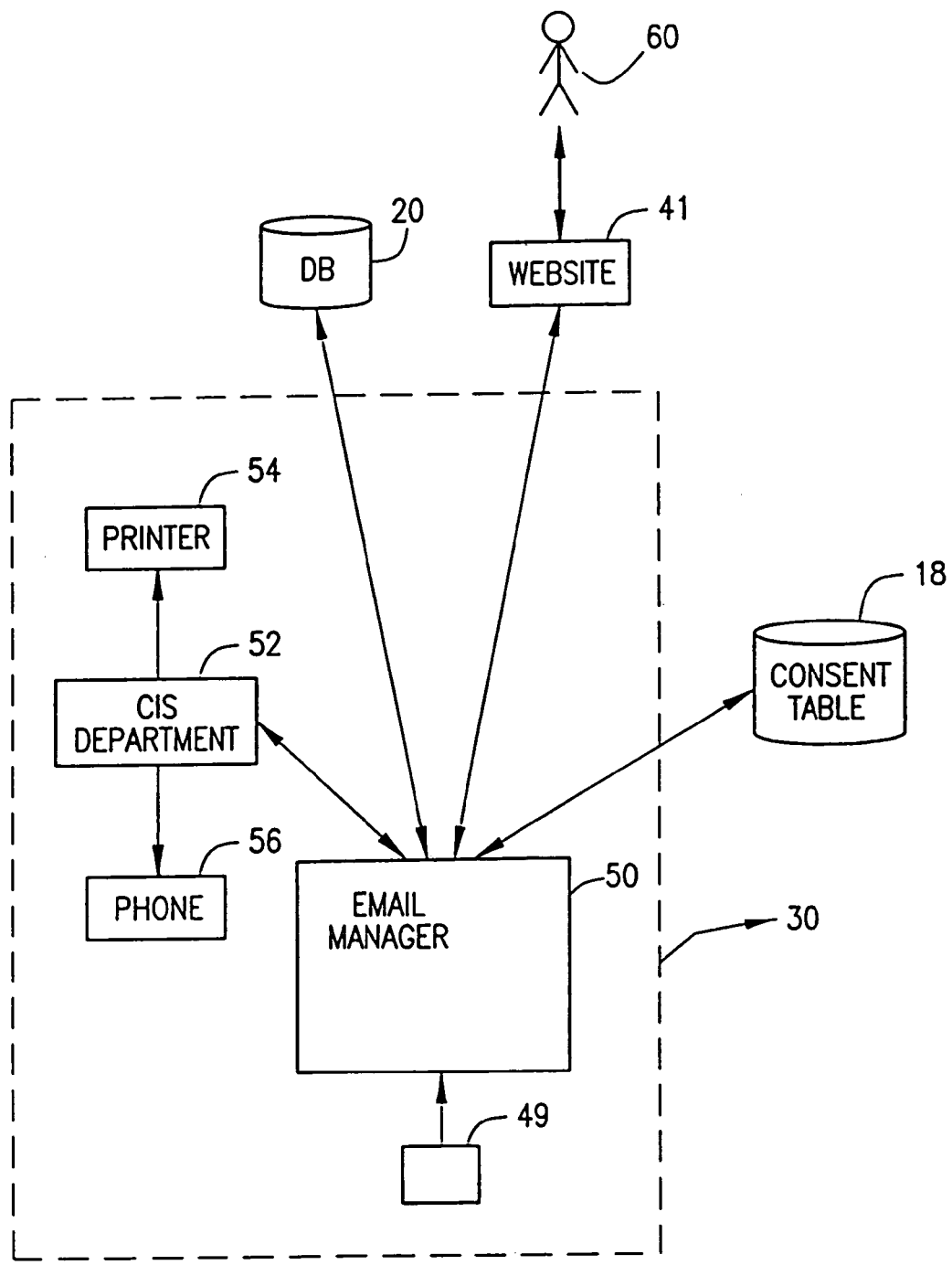
FIG. 3 is a simplified schematic representation illustrating another example of a computer network configuration for use with an exemplary embodiment of the present invention.

With reference now to FIG. 3, an example failed email monitoring system 30 in accordance with an exemplary preferred embodiment of the invention is illustrated. It should be understood, however, that the failed email monitoring system 30 operates independent of any particular arrangement or mix of network components and that the failed email monitoring system 30 depicted in FIG. 3 is purely illustrative and simplified for the purpose of explanation.

Figure 4:
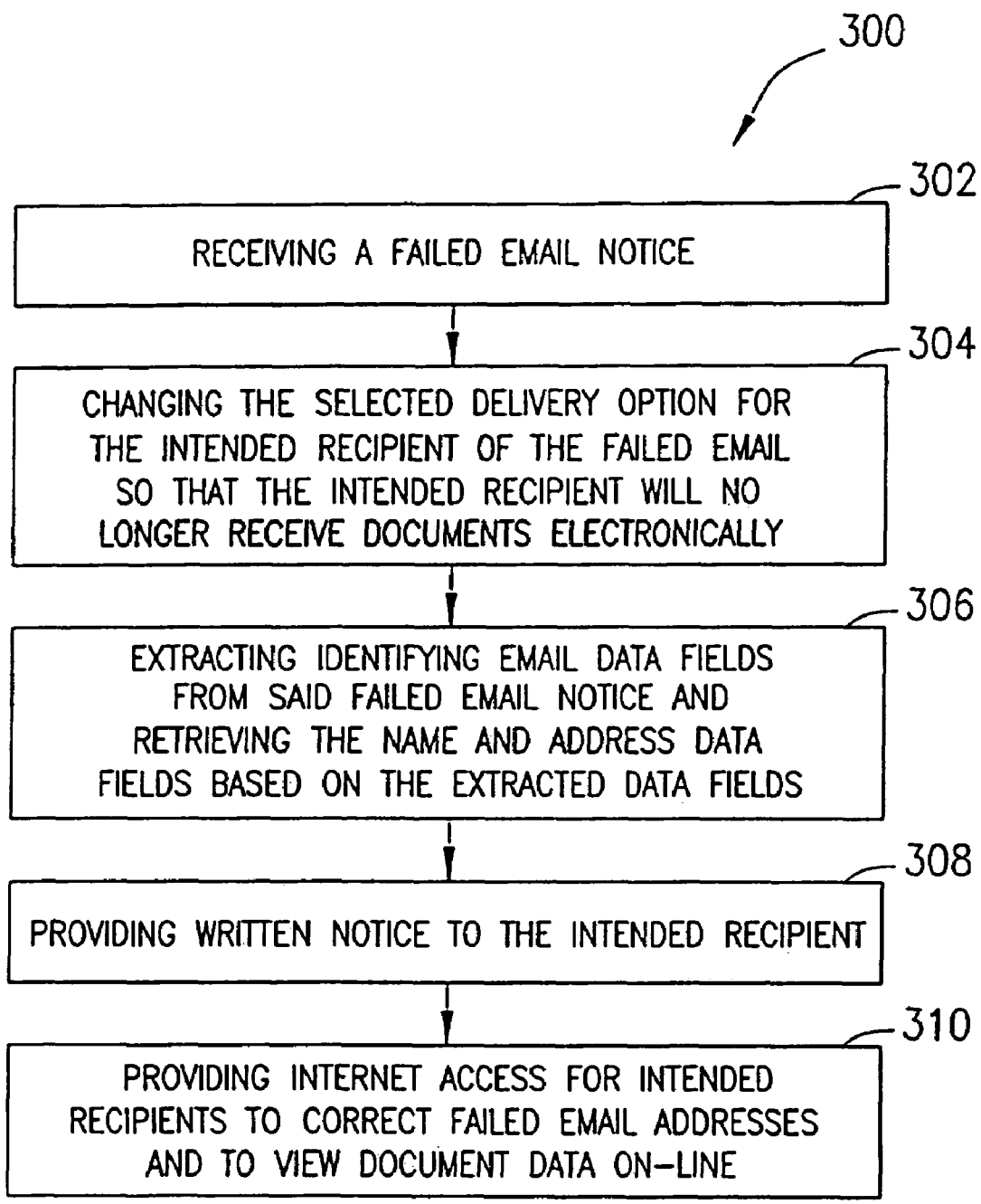
FIG. 4 is a simplified flowchart of a method for monitoring and correcting the failed electronic delivery of a document in accordance with an exemplary embodiment of the present invention.

FIG. 4 shows a block diagram 300 illustrating steps in a method of operation of the failed email monitoring system 30. In step 302, a failed email manager 50 receives a failed email notice 49. In step 304, in response to the failed email notice 49, the failed email manager 50 changes the document delivery option stored in the consent database 18 so that the intended recipient of the failed email receives only non-electronic documents. In accordance with an exemplary embodiment, the failed email manager 50 may be comprised of a server element 51 and a processing element 53.

In step 306, the failed email manager 50, preferably via processing element 53, extracts identifying email data fields from the failed email notice 49 and retrieves the corresponding customer 24's name and address data fields based on the extracted data fields. In accordance with an exemplary embodiment, the identify email data fields may include, for example, the failed email address and/or selected portions of the failed email address. Further in accordance with an exemplary embodiment, the failed email manager 50 may then accesses a database such as the central database 20 to look up and retrieve the appropriate contact information for the customer 24 associated with the extracted identify email data fields. Such contact information may include, for instance, the name, telephone number and home address of the customer 24. The failed email manager 50 may then forward the failed email notice 49 to an appropriate department 52 which may contact the customer 24 directly via a telephone 56 if the contact information is available to do so.

In step 308, the failed email manager 50 may prompt the appropriate department 52 to print a written notice of the failed email attempt and send the written notice of the failed email attempt to the customer 24 via mail or facsimile. In accordance with an exemplary embodiment of the present invention, such written notice of the failed email attempt may include instructions 60 for the customer 24, in step 310, to access a web server 40 to correct the cause of the failed email and to view the document data contained in the failed email. Further in accordance with an exemplary preferred embodiment of the present invention, a postcard form may be provided within the website 41 to assist the customer 24 in correcting the cause of the failed email attempt. According to this feature of the present invention, the customer 24 may print the postcard form, provide the requested information on the postcard form and mail the postcard form back to the appropriate department 52 to update the customer 24's email information.

Figure 5:
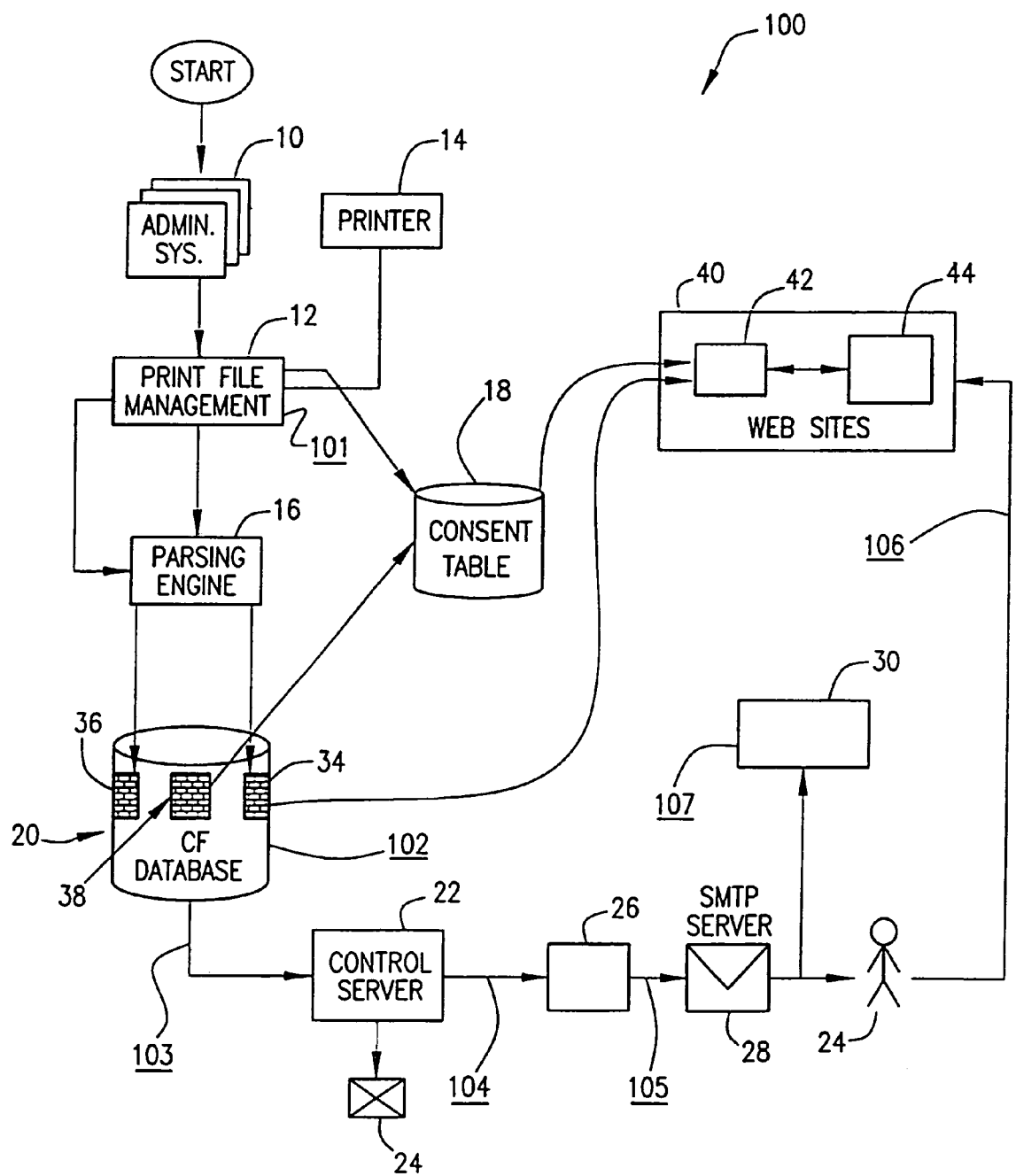
FIG. 5 is a simplified schematic representation illustrating another example of a computer network configuration for use with an exemplary the present invention.

With reference now to FIG. 5, an exemplary system for monitoring the electronic delivery of documents is illustrated. As discussed above with reference to FIGS. 1 and 3, FIG. 5 illustrates an example network arrangement 100 employing a system and method of the present invention in accordance with an exemplary embodiment of the invention. It should be understood that the present invention operates independent of any particular arrangement or mix of network components and that the network 100 depicted in FIG. 5 is purely illustrative and simplified for the purpose of explanation. In accordance with an exemplary embodiment of the present invention, selected system data may be monitored at points throughout the network arrangement 100 and stored within a central database 20 which is then made available to selected network users. In accordance with an exemplary embodiment of the present invention, the system data may preferably be monitored via the creation of log files which contain the selected system data and which are forwarded to a central location for processing and storage. In accordance with an exemplary embodiment of the present invention, the log files are preferably processed for storage by a parsing engine 16 which parses the log files into retrievable data. Further in accordance with an exemplary embodiment of the present invention, the data parsed by the parsing engine 16 is preferably forwarded to central database 20 for later retrieval and analysis.

As shown in FIG. 5, the log files may be produced at various collection points throughout the network 100. In accordance with an exemplary embodiment of the present invention, such collection points may include for instance, a collection point 101 from within the print management server 12 may be used for collecting data such as, for example, the file names of documents printed, the number of documents printed and the date and time of the document printing. Additionally, a collection point 102 from within customer database 34 may be used for collecting data such as, for example, the file names of documents accessed and/or printed via the web server 40, the names of customers accessing documents, the dates and times each time a document is accessed. Further, a collection point 103 between the central database 20 and the control center 22 may be used for collecting data such as, for example, the file names of documents processed for electronic delivery; the number of documents processed and the dates and times each document is processed. Still further, a collection point 104 between the control center 22 and the server 26 may be used for collecting data such as, for example, the file names of documents processed, the number of documents approved for delivery from the control center, and the time and date for processing each delivery.

As further shown in FIG. 5, a collection point 105 may also be used between the server 26 and the email server 28 for collecting data such as, for example, the identification number of any email notifications produced, the file names of documents processed, and the time and date for processing each notification or document. Additionally, a collection point 106 at the web server 40 may further be used for collecting data such as, for example, the name and login dates and times for each customer accessing the web server 40. In addition, a collection point 107 may also be employed at the failed email monitoring system 30 for collecting data such as, for example, the identification of any failed email notifications received, the name of any failed email recipients, the addresses of each failed email and the dates and times of each failed email delivery.

In accordance with an exemplary embodiment of the present invention, the data collected at each collection point, may be used, for example to determine, for example, the identity of the top recipients of electronic and non-electronic documents. Such information preferably may be able to compiled using a database query.

As is readily apparent from the above detailed description, the system and method of the present invention may be used in a variety of network configuration and is not intended to be limited to the example network configuration shown. For instance, though the example configuration of the present invention uses multiple databases and servers to store and access information, the present invention may also be configured so that only a single database and server are used. Alternatively, the databases of the present invention may also be broken up into several more discrete databases which may be distributed or duplicated on several servers.

Additionally, the present invention may be used within network arrangements such as local area networks (LAN), including Ethernet and Token Ring access methods, wireless local area networks (WLAN), metropolitan area networks (MAN), virtual local area networks (VLAN), wide area networks (WAN), and Bluetooth networks. Additionally, the present invention may work within wireless data networks such as GPRS, NTT DoCoMo, Hot Spots, GSM-Data, CDMA-One and HS-CDS networks, and wired public networks such as POTS, DSL, Cable and ISDN networks.

Further, although the exemplary embodiments are discussed without reference to a particular operating environment, the present invention may be used in a variety of server platforms and operating environments such as, for example, Windows NT, Me, XP, 95, 98 and 2000 operating systems, as well as the Unix operating system, the OS/2 operating system, the Pocket PC operating systems and the NetWare operating system.

Additionally, the present invention may be used with a variety of networking links and protocols including those based upon, for example, a Network File System (NFS); a Web NFS; a Server Message Block (SMB); a Samba; a Netware Core Protocol (NCP); a Distributed File System (DFS), and a Common Internet File System (CIFS) architecture, and may use such transport protocols as, for example, TCP/IP, IPX/SPX, HTTP, HTTPS and NetBEUI.

The invention has been described with particular reference to embodiments which are intended to be illustrative rather than restrictive. Alternative embodiments will be apparent to those skilled in the art to which this invention pertains without departing from its spirit and scope. Thus, such variations and modifications of the present invention can be effected within the spirit and scope of the following claims.

What is claimed is:

1. In a document delivery system which includes a document system for producing document data and document print requests, a print management system for determining whether a requested document is designated for electronic delivery or non-electronic delivery based on a stored document delivery designation, and a failed email management system which is configured to receive a notice of a failed email delivery and to change a document delivery designation for at least the intended recipient of the failed email, a method of monitoring the electronic delivery of documents, the method comprising the steps of:
    creating log files for storing selected data related to selected electronic document preparation and delivery events;
    forwarding the log files to a parsing engine;
    parsing the log files to retrieve selected data; and
    storing the retrieved selected data for retrieval and analysis.

2. The method of claim 1, wherein the log files are stored within a restricted database for controlling access.

3. The method of claim 1, wherein at least one of the log files are created within the print management system.

4. The method of claim 1, wherein at least one of the log files is created within the failed email monitoring system.

5. The method of claim 4, wherein the data stored includes at least: the identification of failed email notifications received, the names of failed email recipients, the addresses of each failed email recipient or the dates and times of each failed email delivery.

6. A system for monitoring the electronic delivery of documents, the system comprising:
    a document system, the document system producing document information for printing documents;
    a print management system, wherein the print management system accepts document data and document print requests from the document system, and further wherein the print management system determines whether a requested document is designated for electronic delivery or non-electronic delivery;
    a recipient database, wherein the recipient database stores recipient information;
    a print system, wherein the print system is configured to receive and print documents designated for non-electronic delivery;
    an email system, the email system configured to accept and process document data for creating and delivering documents electronically;
    a failed email management system, wherein the failed email management system is configured to receive a notice of a failed email delivery including a failed email address, and to change a document delivery designation for at least the intended recipient of the failed email; and
    an electronic monitoring system for creating and storing log files containing data related to selected document delivery events.

7. The system of claim 6, wherein the system further comprises an Internet server, wherein the Internet server provides on-line access to the document data and electronic documents.

8. The system of claim 7, wherein the electronic monitoring system further comprises a parsing engine which parses the log files into retrievable data which is then stored for later retrieval and analysis.

9. The system of claim 7, wherein at least one of the log files are created within the print management system.

10. The system of claim 7, wherein at least one of the log files is created within the recipient database.

11. The system of claim 10, wherein the data stored includes at least: the file names of documents accessed or printed; the names of customers accessing documents, or the dates and times a document is accessed.

12. The system of claim 7, wherein at least one of the log files is created within the failed email monitoring system.

13. The system of claim 12, wherein the data stored includes at least: the identification of failed email notifications received, the names of failed email recipients, the addresses of failed email recipients or the dates and times of failed email deliveries.

14. The system of claim 7, wherein at least one of the log files is created within the email system.

15. The system of claim 14, wherein the data stored includes at least: the file names of documents processed for electronic delivery, the number of documents approved for delivery, the number of documents processed, dates and times each document is processed, or the identification number of any email notifications produced.

16. The system of claim 7, wherein at least one of the log files is created within the Internet server.

17. The system of claim 16, wherein the data stored includes at least: the names of customers accessing the Internet server, or the dates and times customers access the Internet server.

18. A method for electronically delivering documents, the method comprising the steps of:
    producing document data for printing documents;
    accepting requests to print selected documents;
    determining whether a selected document is accepted for electronic delivery or for non-electronic delivery;
    printing documents accepted for non-electronic delivery;
    storing documents and document data for documents accepted for electronic delivery;
    providing Internet access to the documents and document data accepted for electronic delivery;
    providing notice regarding the status and availability of the stored documents and document data to intended document recipients;
    detecting the failed delivery of notices to intended notice recipients; and
    creating log files containing system data related to selected electronic document preparation events,
    parsing the log files to retrieve system data; and
    storing the retrieved system data for later retrieval and analysis.

19. The method of claim 18, wherein the method further comprises the step of storing one or more preferred document delivery options for each potential document recipient.

20. The method of claim 18, wherein the preferred document delivery options include an option to receive documents electronically and an option to receive documents non-electronically.

21. A system for monitoring the electronic delivery of documents, the system comprising:
- a document system, the document system producing document information for printing documents;
- a print management system, wherein the print management system accepts document data and document print requests from the document system, and further wherein the print management system determines whether a requested document is designated for electronic delivery or non-electronic delivery;
- a recipient database, wherein the recipient database stores recipient information;
- a print system, wherein the print system is configured to receive and print documents designated for non-electronic delivery;
- an email system, the email system configured to accept and process document data for creating and delivering documents electronically.

22. A method for electronically delivering documents, the method comprising the steps of:
- producing document data for printing documents;
- accepting requests to print selected documents;
- determining whether a selected document is accepted for electronic delivery or for non-electronic delivery;
- printing documents accepted for non-electronic delivery;
- storing documents and document data for documents accepted for electronic delivery;
- providing Internet access to the documents and document data accepted for electronic delivery;
- providing notice regarding the status and availability of the stored documents and document data to intended document recipients.

* * * * *